(12) United States Patent
Menczel et al.

(10) Patent No.: US 8,549,319 B2
(45) Date of Patent: *Oct. 1, 2013

(54) SYSTEMS AND ALGORITHMS FOR STATELESS BIOMETRIC RECOGNITION

(75) Inventors: Yaron Menczel, Mevasseret Zion (IL); Yair Shachar, Ramat Gan (IL); Josef Brikman, Tenafly, NJ (US)

(73) Assignee: Memphis Technologies, Inc, Boca Raton, FL (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/352,443

(22) Filed: Jan. 18, 2012

(65) Prior Publication Data
US 2013/0015952 A1    Jan. 17, 2013

Related U.S. Application Data

(63) Continuation of application No. 11/216,022, filed on Sep. 1, 2005, now Pat. No. 8,122,259.

(51) Int. Cl.
*G06F 21/00* (2013.01)

(52) U.S. Cl.
USPC ........... 713/186; 713/182; 713/183; 713/184; 713/185; 340/5.81; 340/5.82; 340/5.83; 340/5.84; 340/5.52; 382/115; 382/116; 382/117; 382/118; 382/119; 382/124

(58) Field of Classification Search
USPC ................ 713/182–186; 382/115–119, 124; 340/5.81–5.84, 5.52
See application file for complete search history.

(56) References Cited

U.S. PATENT DOCUMENTS

| | | | |
|---|---|---|---|
| 4,639,729 A | 1/1987 | Savit | |
| 5,627,567 A | 5/1997 | Davidson | |
| 6,311,272 B1 | 10/2001 | Gressel | |
| 6,665,644 B1 | 12/2003 | Kanevsky et al. | |
| 6,765,470 B2 | 7/2004 | Shinzaki | |
| 7,103,852 B2 | 9/2006 | Kairis | |
| 7,154,483 B2 | 12/2006 | Kybayashi | |
| 7,171,686 B1 | 1/2007 | Jansen et al. | |
| 7,370,208 B2 * | 5/2008 | Levin et al. | 713/182 |
| 7,620,824 B2 | 11/2009 | Iino | |
| 7,620,894 B1 | 11/2009 | Kahn | |
| 7,649,526 B2 | 1/2010 | Ording et al. | |
| 7,856,558 B2 * | 12/2010 | Martin et al. | 713/186 |
| 7,898,394 B2 | 3/2011 | Hibbets | |
| 7,984,382 B2 | 7/2011 | Kelley et al. | |
| 2003/0160808 A1 | 8/2003 | Foote et al. | |

(Continued)

OTHER PUBLICATIONS

Penny Khaw, "Iris Recognition Technology for improved Authentication", 2002, Sans Institute.*

(Continued)

*Primary Examiner* — Taghi Arani
*Assistant Examiner* — Josnel Jeudy
(74) *Attorney, Agent, or Firm* — Mitchell A. Rossman; Terra Nova Patent Law, PLLC

(57) ABSTRACT

A system and algorithms to authenticate a person where a system only has some standard personal text data about the person, and cannot have a real biometric template obtained using an enrollment procedure. The authentication allows access to restricted resources by the person. This method is especially useful when it is used as an auxiliary authentication service with other methods such as password or Callback that dramatically lower the chances for an imposter.

5 Claims, 4 Drawing Sheets

(56) References Cited

U.S. PATENT DOCUMENTS

| | | |
|---|---|---|
| 2003/0200217 A1 | 10/2003 | Ackerman |
| 2004/0143523 A1 | 7/2004 | Pegaz-Paquet et al. |
| 2006/0265602 A1* | 11/2006 | Robinson .................... 713/186 |
| 2007/0061590 A1* | 3/2007 | Boye et al. .................... 713/186 |
| 2007/0271512 A1 | 11/2007 | Knight et al. |
| 2008/0024459 A1 | 1/2008 | Poupyrev et al. |
| 2009/0184938 A1 | 7/2009 | Mayer et al. |
| 2010/0007601 A1 | 1/2010 | Lashina et al. |
| 2010/0124377 A1 | 5/2010 | Yu et al. |
| 2010/0214267 A1 | 8/2010 | Radivojevic et al. |
| 2011/0126024 A1* | 5/2011 | Beatson et al. ............... 713/186 |

OTHER PUBLICATIONS

Kwon, et al. "Age Classification from Facial Images," Computer Vision and Image Understanding, vol. 74, No. 1, Apr. 1999, pp. 1-21, Academic Press.

Blackshaw, et al. "Gender and Age Determination of a Speaker," May 6, 2007, downloaded from the Internet at http://mattblackshaw.com/project/agegender/paper.pdf on Nov. 15, 2011.

Lincoln, et al., "A Comparison of Two Unsupervised Approaches to Accent Identification," Proceeding of the 5th International Conference on Spoken Language Processing (ICSLP-98), Sydney, AS, Dec. 1998.

Schotz, "A Perceptual Study of Speaker Age," Working Papers, 49 (2001), pp. 136-139, Lund University, SE, Department of Linguistics.

Schotz, "Towards Synthesis of Speaker Age: A Perceptual Study with Natural, Synthesized, and Resynthesized Stimuli," PHONUM 9 (2003), pp. 153-156, Umea University, Department of Philosophy and Linguistics, SE.

Schotz, "Trying to Improve an Automatic Estimator of Speaker Age," Department of Linguistics and Phonetics, Lund University, SE, 2004, pp. 1-11. Please note: This document was submitted on Sep. 22, 2005 in an IDS for U.S. Appl. No. 11/216,022. However, Applicants have been unable to locate a copy of this document. Applicants believe that it was downloaded from the internet sometime before Sep. 2005.

Schotz, "Prosodic and Non-Prosodic Cues in Human and Machine Estimation of Female and Male Speaker Age," Department of Linguistics and Phonetics, Lund University, SE, 2004, pp. 1-10.

Schotz, "Some Acoustic Cues to Human and Machine Estimation of Speaker Age," Proceedings, FONETIK, Department of Linguistics and Phonetics, Lund University, SE, 2004.

Schotz, "Automatic Prediction of Speaker Age Using CART," Course in Speach Recognition, Term Paper, Fall Semester 2003, Department of Linguistics and Phonetics, Lund University, SE.

Schotz, "Automatic Estimation of Speaker Age Using CART," Lund University, SE, Department of Linguistics, Working Papers, 51, (2005) 155-168.

Wang, et al., "Empirical evaluation for finger input properties in multitouch interaction,", 2009.

* cited by examiner

SYSTEMS AND ALGORITHMS FOR STATELESS BIOMETRIC RECOGNITION

RELATED APPLICATIONS

This is a continuation of U.S. patent application Ser. No. 11/216,022, filed Sep. 1, 2005 now U.S. Pat. No. 8,122,259, which is hereby incorporated by reference in its entirety for all purposes.

FIELD OF THE INVENTION

The present invention relates to Computer Telephony Integration (CTI); specifically, to systems and algorithms which need to Authenticate a person before allowing him to use a certain device or gain access to a restricted area.

BACKGROUND OF THE INVENTION

In a variety of applications there is a need to authenticate the identity of a user before he can use a certain service, or gain access to a restricted data or a physical location. A common approach to address this need is by using computerized biometric verification techniques. According to this two steps approach, the first step is known as "enrollment" where an identifiable and preferably unique set of biometric characteristics of a person are being extracted to generate a "template" aimed to function as a biometric signature of that person. The template is then being stored in a centralized data base. In the second step (usually at a distinct occasion and can be repeated for many times), the same biometric characteristics are being extracted to generate yet another template which is compared to the first template. If there is a high degree of match between the parameters in the two templates beyond a certain threshold, the person is authenticated in the biometrical sense. In the known art, there are variety of methods to implement this approach which are based on different biometrical attributes (also known as modalities) such as human face, iris, voice, finger print, hand geometry and others. It is also possible to combine several of these modalities to create a multimodal solution e.g. using both face and finger print parameters.

While the biometric approach for authentication is gaining an increasing popularity, there are some barriers for a massive use of it in many applications. Two of these barriers are:

1) The need for the "enrollment" step, where in this step the user identity is needed to be determined by his/her physical attendance at some specific location, where he/her can show an identifier (e.g. an identity card). Then, one needs to go through the enrollment process which can be a time consuming and expensive process.

2) Storing user's biometric data in some organization's centralized database generates a real privacy problem, and is even currently illegal in some places. In addition, in some cases it is prohibitive to use persistent data. An alternative approach to central storing is to store the information on a personal "smart card", which is being kept within the user possession. While this alternative reduces the extent privacy problem it is cumbersome, not practical and too expensive for many applications.

In many cases, biometric verification is often used only as a complementary mean to other simpler authentication methods like the use of password. Many web sites use only password to assure that the person logged in is indeed the legitimate person and not an imposer. It has been demonstrated that adding a biometric check in addition to password, reduces abuses significantly.

SUMMARY OF THE INVENTION

The current invention discloses a new approach for authentication of users which are seeking to get access to restricted services, contents or physical locations. It utilizes stateless biometric methods, which do not include the process of enrollment and storing the sensitive biometric user data in a database or any other storing device (centralized or personalized). Instead, only standard (e.g. date of birth, address, gender, birthplace, social security number) are being stored. When a person is asking for an access to the restricted resource, biometric data of the person is being extracted "on the fly" as part of its interaction with the system. That biometric data is compared to the actual subset of standard personal details that are known about the person. According to this comparison, the system can determine whether or not to exclude him/her from access to the restricted resource.

Some embodiments of the present invention depict classification of user attributes into groups. The group classification can be used as part of the authentication procedure by comparing the classification data to the personal details record or directly as a decision factor.

Some embodiments of the present invention depict an auto bill pay system for example via a phone. As part of the user authentication procedure he/she is requested to provide one or several voice responses to an Interactive Voice Response (IVR) system. The voice of this person is being analyzed to biometrically extract and estimate attributes such as person age, gender, ethnical origin, pronunciation, emotional state (e.g. what is the voice credibility level as analyzed by ones voice) and alcoholic blood level. Some attributes (e.g. gender, age, ethnical origin) may be compared against the personal details data record to check for a correspondence. Additionally, some of these attributes (e.g. age, emotional stage, and alcoholic blood level) can be used directly as a decision factor. For example, a young child or a person recognized by the system to have high alcoholic blood level and/or low voice credibility level may not be granted with an access to a restricted auto bill pay system.

Optionally, the above embodiments may generate a biometric voice template (or templates) for the attending user. But instead of authenticating the person by comparing the voice template to a pre stored template (as commonly being done in the current art), this template will be compared vis-à-vis to a "black list" of templates representing, for example, known criminals or those who are suspected to previously be involved in improper usage of the system.

Some embodiments of the present invention may be assisted by other means to raise its confidence level. For example, the system may initiate a phone call to a person (Call Back scenario), to significantly reduce the probability for an imposer. It still may be the case that someone else answered the call, but that usually is done innocently, and the methods disclosed in this invention may recognize these latter cases with a high probability.

Some embodiment of the present invention may use speech recognition on a spoken speech segment of the user. For example, the user might be asked to provide information items such as (but not limited to) birth date, social security number, maiden name of his mother. That speech segment will be sent to a speech recognition element to translate it to a data record and then to compare it to existing data record or records.

Some embodiment of the present invention may use the recorded speech as digital signature to provide either directly or indirectly a recorded copy of the transaction and/or a proof that a transaction was authorized by the user.

Some embodiments of the present invention depict a system controlling access to restricted content, for example adult entertainment on the World Wide Web or TV. As part of the access control procedure, the user is requested to provide one or several voice responses to an Interactive Voice Response (IVR) system. As in the previous embodiment, the voice sample or samples are analyzed to biometrically extract and estimate attributes, and used in a procedure similar to what have been described. For example, it can be used to block child access to adult entertainment material if the age value as recognized by his voice, is smaller than a certain threshold.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention The present invention will be understood and appreciated more fully from the following detailed description taken in conjunction with the drawings in which:

Figure 1:
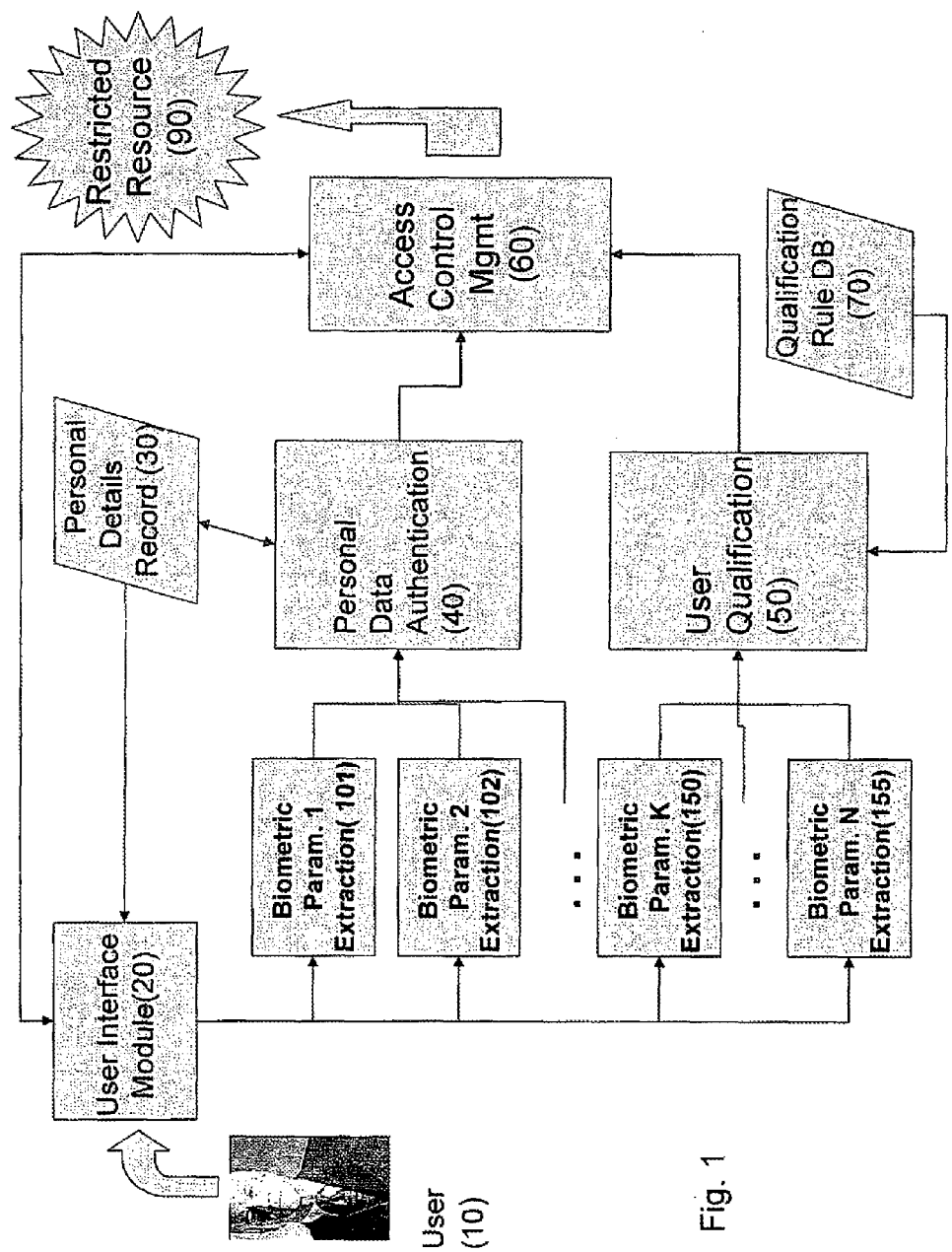
FIG. 1 depicts a general scheme of an authentication method according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Attention is made now to FIG. 1, which depicts a user (10) asking to get access to a restricted resource or resources (90). A computerized User Interface Module—UIM (20) is used to interact with the user, give him/her some instructions and information, prompting the user to provide its intended request, some of his/her personal details and other information item including (but not limited to) authentication data like a password. The supplied user data can be tested vis-à-vis the personal data record of the user, as stored in the system database.

One example of such a user interface module is known as IVR (Interactive Voice Response) subsystem which is possibly part of the UIM-20. Other configurations of UIM may be used as well. In addition and as part of this invention, the UIM receives a biometric sample or samples of the user. This can be accomplished either by an explicit request from the user to provide it, or implicitly as part of the user interaction process. The biometric sample or samples may include (but not limited to) items like voice sample(s), person image(s) or video clips, key stroke pattern and finger print data.

A plurality of N (N>=1) biometric extraction modules (101-155) may then be used to extract corresponding biometric-based parameters from the user's biometric samples. For example, a voice sample of a user can be used to extract parameters such as (but not limited to):

a) Age of the user.
b) Gender
c) Ethnical or geographical origin
d) Pronunciation
e) Emotional state of the user
f) Credibility
g) Level of Alcohol or other materials in the user's blood.

A typical outcome of each biometric extraction module is a probability function, which defines the estimated probability of the corresponding parameter to match to certain values or a set of ranges of values of the investigated biometric identifier. For example, a possible result of an Age extractor, investigating the age-identifier for a specific sample is given in the following table 1-1:

| Group | Age value 1 | Age value 2 | Probability |
| --- | --- | --- | --- |
| 1 | 0 | 18 | 0.1 |
| 2 | 18 | 40 | 0.3 |
| 3 | 40 | 60 | 0.5 |
| 4 | 60 | 120 | 0.1 |

The column <Age value 1> defines the lowest value of each age group. The column <Age value 2> defines the lowest value of each age group which is above the maximal age of that group. The probability column defines the estimated probability of the user's age to belong to each group as generated by the biometric extraction module algorithm based on the sample.

Each biometric extraction module result, may be used as an input to a Personal Data Authentication block (40 and/or to a User Qualification block (50)). For the purpose of a clear illustration of the interaction between the different modules in FIG. 1, it is shown in this figure that each biometric extraction module is directed either to Personal Data Authentication block (40) or to a User Qualification block (50). Modules (101, 102 . . . ) are used as an input to the first block and modules (150,151 . . . ) to the latter. The reader should note that the output of the same extractor module may serve as an input to both blocks. In this case, one may think on such a module as duplicated into two modules one in the group of modules numbered as (101,102 . . . ) and the other reproduction in the group numbered as (150,151 . . . ).

At the Personal Data Authentication block (40) a valuation process may be commenced, based on the outputs of modules (100,101 . . . ), for a match between known user parameters which are given in a data record such as the Personal Details Record (30) and results of the biometric extraction module(s). Preferably, as a result of this valuation process, a score vector is generated. Also according to preferred embodiments of this invention, the Personal Details Record (30) does not contain biometric template but rather just data items. For example, if the actual user age appears in the Personal Details Record (30), one possible valuation process is a comparison of this age value versus the output of a corresponding age biometric extraction module as shown in table 1-1. Other types of a valuation process and/or biometric parameters may take place as well, and forms of result, other than a score vector may be generated.

In addition, block (40) may contain a fusion module, in case where this block receives results from a plurality of biometric extraction modules (101, 102 . . . ). A fusion module preferably generates a single result vector as a function of the input parameter space. There are many fusion methods in the existing art which are known to the proficient reader.

At the User Qualification block (50) a valuation process may be commenced, based on the outputs of modules (150, 151 . . . ), for computing the qualification level that that particular user may be able to access the restricted resource or resources (90). At this block the qualification level is not calculated based on a match with the user' Personal Details Record (30), but rather directly as a result of the extracted biometric parameters. Preferably, as a result of this valuation process, a score vector is generated. For example, an age value output of a corresponding age biometric extraction module may be used as a criterion for accessing a restricted resource involving payments and/or access to an adult entertainment material. For values as shown in table 1-1, the valuation process may give high qualification score to the age parameter since there is a high probability that the user is over 18 years old. Another possible parameter is the estimation of the user alcoholic level in blood extracted out of his/here voice tract. High estimated blood alcohol level may generate a low qualification score. The set of rules determining the qualification valuation process may reside in a predefined Qualification Rule database (70). Other types of a valuation process and/or biometric parameters may take place as well, and forms of result, other than a score vector may be generated.

In a similar manner to the above description for block (40), block (50) may also contain a fusion module, in case where this block receives results from a plurality of biometric extraction modules (151, 152 . . . ).

In other embodiments, either the Personal Data Authentication block (40) or the User Qualification block (50) may be omitted, or being activated each only on a sub group of the users. It is also possible that the list of active modules (100, 101 . . . ) and/or modules (150,151 . . . ) will be determined per user or per a group of users.

Further according to a preferred embodiment of this invention. The Access Control Management block 60, receives the valuation results of blocks (40) and (50). Based on these results and possibly on the standard authentication process as described herein above, the user is either being granted access to the restricted resources, denied access to the resource, or being transferred to a human help desk for additional examination (not shown in FIG. 1). The UIM (20) is used to handle the interface with the user for these different cases.

Figure 2:
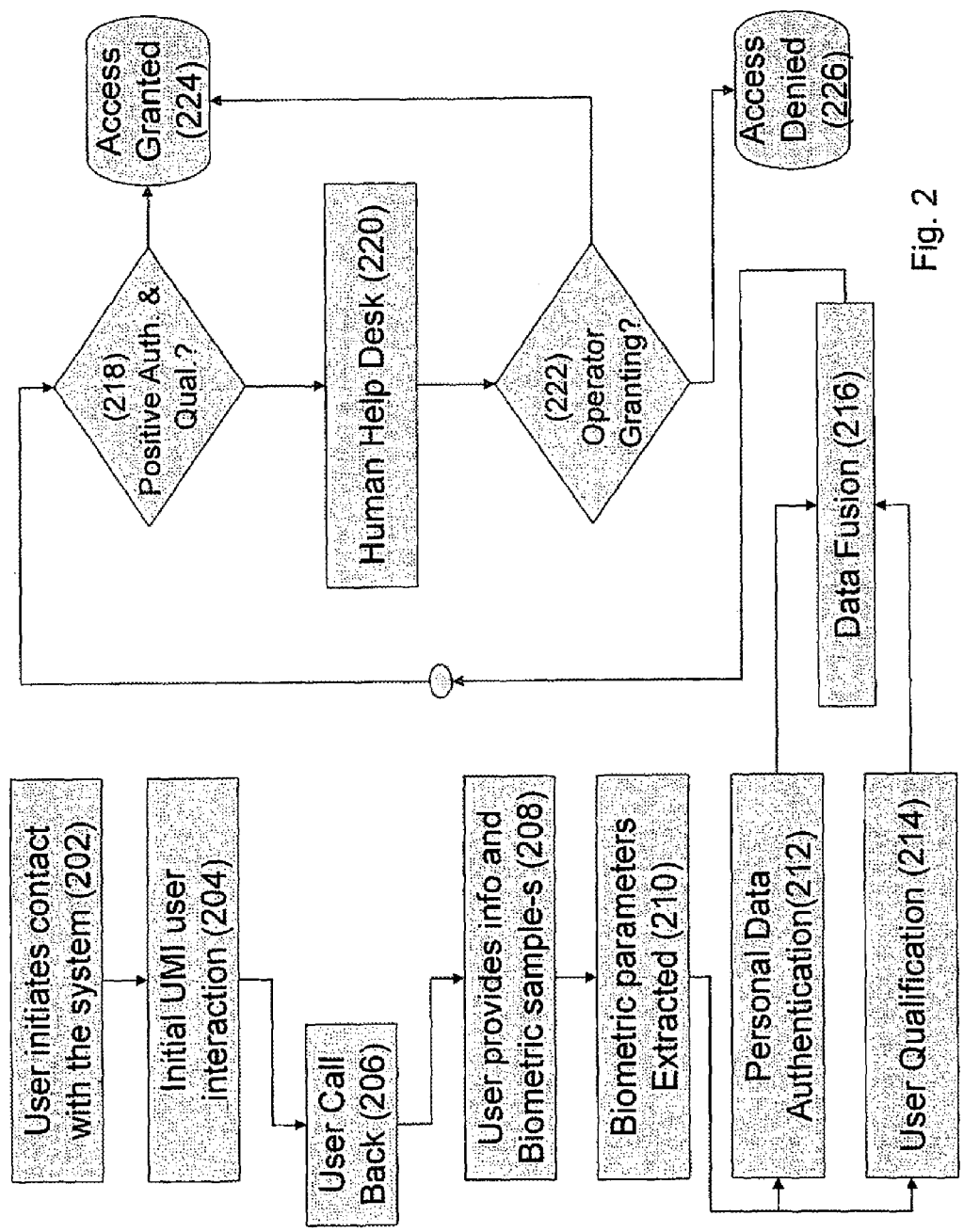
FIG. 2 depicts an auto bill pay system according to an embodiment of the of the present invention.
Figure 3:
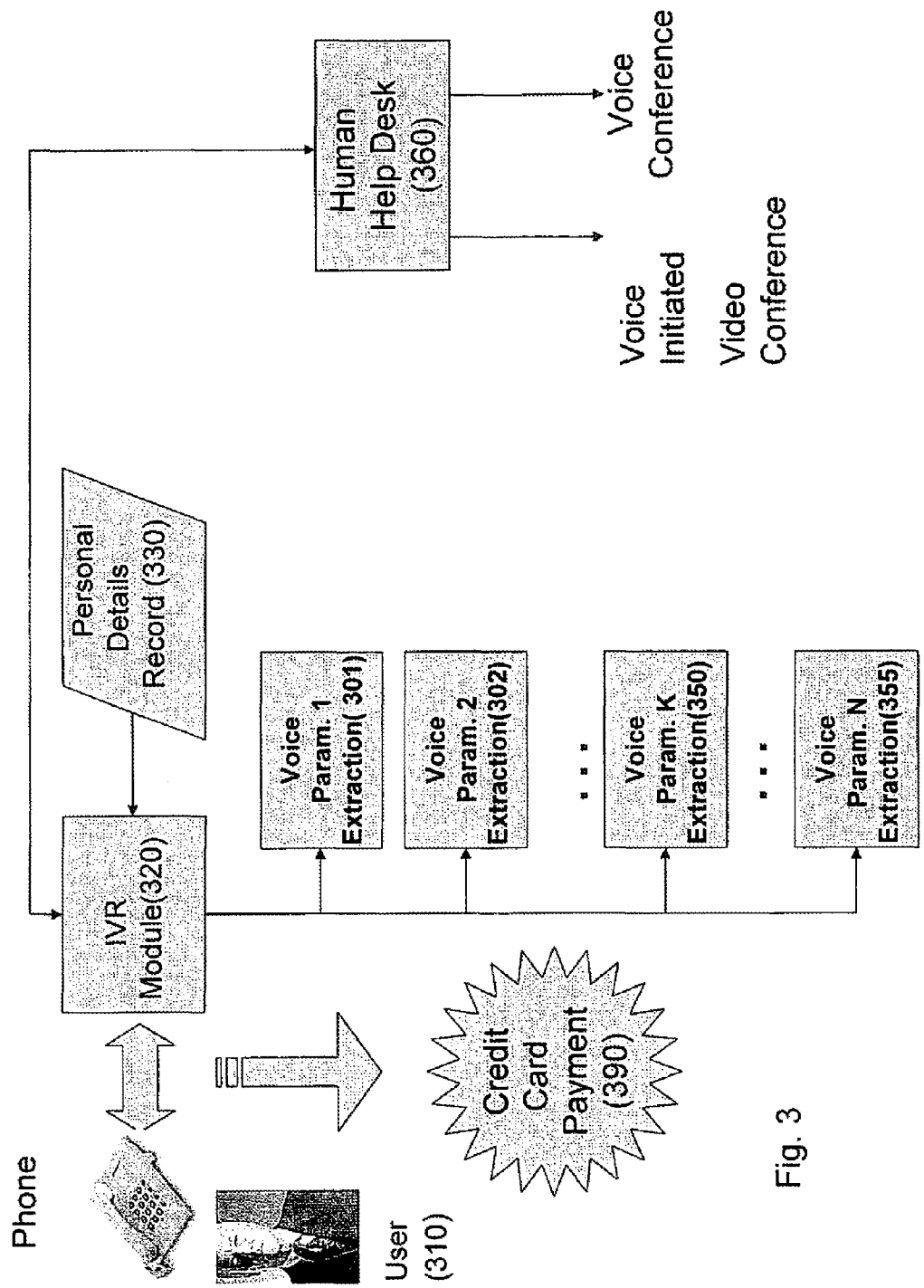
FIG. 3 depicts a content access control system according to an embodiment of the present invention.

FIG. 2 depicts a flow chart of a preferred embodiment of the current invention. In one case the user initiates the contact with the system (202), via the UIM (20) for an initial interaction with (204). The system may initiate a "call back" or a "contact back" procedure. It is well known from the state of the art in the field that call back is a useful way to limit attempts to steal the identity of valid users by imposters. In an alternative case, the system may initiate the contact with the user at (202). A standard authentication process as described herein above, may be employed. As part of this procedure or as a separate process, the user provides a biometric sample or samples (208). Some examples of possible types of biometric sample(s) are user's voice tract, image of the user face, iris, finger print, hand geometry and ultra sound image.

As the sample or samples are provided, the corresponding biometric parameter(s) are extracted (210). Following the parameter extractions the process of Personal Data Authentication (212) and/or User Qualification (214) are being performed in the described above manner.

Then, optionally a Data Fusion (216) process may take place in order to generate a unified result or a score vector. In the cases where both Personal Data Authentication (212) and User Qualification (214) are active, the Data Fusion (216) process may comprise two steps, where first the outputs of (212) and (214) are fused separately and then a unified result or a score vector is generated out of the two fused outputs. As part of the fusion process, some cross section statistical processes might be carried out. For example, a process might compare the biometrically extracted ethnical origin of the user, to the ethnical distribution of the user residence location, according to a census, and generate a match score.

If the result of the above process provides a positive <authentication and/or Qualification> of the user, an access in granted (224) to the restricted resource or resources. Otherwise, the user is either rejected or being transferred to a human operator in a helpdesk as shown in the figure (220). The human operator might be randomly selected out of the list of available operators, or selected according to some criteria. For example, operator having a previous experience with the specific user, or having the same age group and/or gender and/or ethnical origin as the user, proximity of the geographic residence locations regarding the user and the operator or other criteria. The operator may pose farther questions to the user and decide (222) to either grant access to the user (224) or deny the access (226) to the restricted resource or resources FIG. 2 depicts an example of an application based on the current invention, a credit card or an auto bill payment system. In this example application, the user interacts with the system via a phone. An Interactive Voice Response module—IVR (320) instantiates User Interface Module—UIM (20) of FIG. 1. The restricted resource in this case is a credit card payment (390) and the user (310) is a one wishing to perform this financial transaction. The Personal Details Record in this case, is the record that the credit card firm maintains in its database for that user (330).

The mechanism for this application is similar to what have been described in FIG. 1. An additional option which is shown here is the ability of an operator on the help desk (360) to hold a voice initiated video and/or data collaboration session with the user. According to this scheme, first a voice conference is being held between the user and the operator, which by a click on a phone button may initiate a full real time collaboration session between the user, the operator and optionally additional parties.

This mechanism is described in full by the U.S. Pat. No. 6,831,675, and later Application Ser. No. 10/801,112.

Figures 4A, 4B:
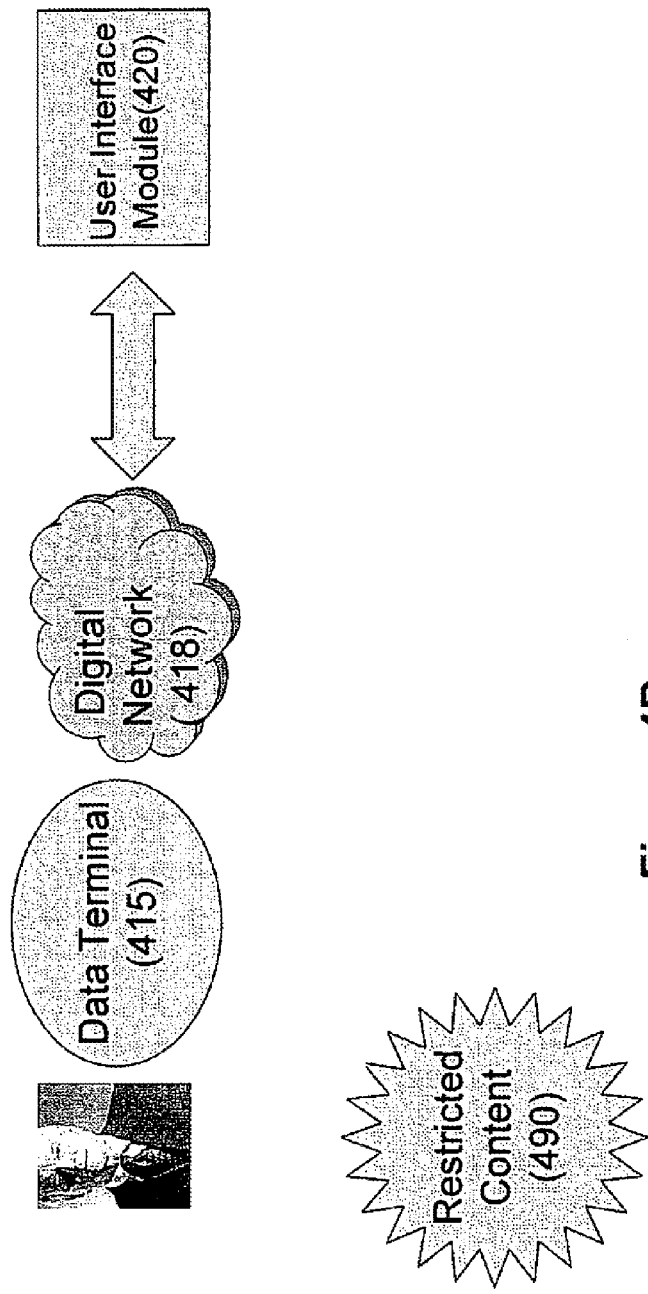
FIG. 4 is a flow chart depicts a method for content access control according to an embodiment of the present invention.

FIG. 4A discloses yet another example of application based on the current invention. In this example, the user is seeking access to a Restricted Content (490). Such content might be a pay per view, adult entertainment or any other type of restricted content in the form of video, voice, images data or any combination of these forms. The user is interacting with the system via a data terminal (415), a digital network (e.g. the internet), and a User Interface Module (420) which may have several modes of operation, for example a web server communicating with user via an HTTP protocol. One possible example of the usage of biometric extraction parameters in this case, is the extraction of the user age and using this parameter as part of the User Qualification Block to determine access rights to an adult entertainment material.

FIG. 4B discloses an application which is similar to that of FIG. 4A. in this case a TV Set (470) is used as the interaction port for the user, and the TV network (472) in any form (analog, digital) as the connection carrying infrastructure between the user and the User Interface Module (420).

The phrase "Interactive Voice Response (IVR) session as used herein may encompass an audio based call between a computer plugged into a phone system and a person who receive a phone call. A voice session may include transmission of analog and/or digital data, and may enable transfer of session data, audio data, and/or other relevant data. The phrase "biometric" as used herein may encompass the act of authentication a person by one of his physical characteristics. The phrase "data terminal" as used herein may encompass any output device, display system, processing unit, computing terminal, personal computer, network computer, mobile communications device that may be used for implementing a voice and/or videoconference and/or data collaboration session.

It will be appreciated by persons skilled in the art that the present invention is not limited by what has been particularly shown and described hereinabove. Alternate embodiments are contemplated which fall within the scope of the invention.

What is claimed is:

1. A method for classifying a user comprising:
   receiving a biometric input from said user;
   extracting at least one biometric-based parameter from said biometric input,
      wherein said biometric-based parameter comprises at least one of age, gender, ethnical or geographical origin, pronunciation, emotional state of the user, credibility level, or level of alcohol or other materials in blood;
   comparing said at least one biometric-based parameter to a known user parameter to provide a comparison,
      provided that said known user parameter does not contain a biometric signature of said user;
   classifying said user based on said comparison to provide a classification; and
   selecting an action based upon said classification.

2. The method of claim 1, wherein the extracting at least one biometric-based parameter results in a probability function that defines one or more estimated probabilities of said biometric-based parameter to match a set of ranges of values.

3. A method for authenticate a user in credit card accounting system comprising:
   receiving a biometric input from said user;
   extracting at least one biometric-based parameter from said biometric input,
      wherein said biometric-based parameter comprises at least one of age, gender, ethnical or geographical origin, pronunciation, emotional state of the user, credibility level, or level of alcohol or other materials in blood;
   comparing said at least one biometric-based parameter to a known user parameter to provide a comparison,
      provided that said known user parameter does not contain a biometric signature of said user; and
   authenticating said user based on said comparison.

4. The method of claim 3, wherein the extracting at least one biometric-based parameter results in a probability function that defines one or more estimated probabilities of said biometric-based parameter to match a set of ranges of values.

5. A system for classifying a user comprising;
   at least one data terminal to receive biometric input of said user;
   at least one extraction unit to extract at least one biometric-based parameter from said biometric input,
      wherein said biometric-based parameter comprises at least one of age, gender, ethnical or geographical origin, pronunciation, emotional state of the user, credibility level, or level of alcohol or other materials in blood;
   comparing said at least one biometric-based parameter to a known user parameter to provide a comparison,
      provided that said known user parameter does not contain a biometric signature of said user;
   classifying said user based on said comparison to provide a classification; and
   selecting an action based upon said classification.

* * * * *